United States Patent [19]

Kojima et al.

[11] Patent Number: 5,228,662
[45] Date of Patent: Jul. 20, 1993

[54] VIBRATION ISOLATION APPARATUS

[75] Inventors: Hiroshi Kojima, Yokohama; Kazuya Takano, Kamakura; Takao Ushijima, Chigasaki, all of Japan

[73] Assignee: Bridgestone Corporation, Tokyo, Japan

[21] Appl. No.: 825,508

[22] Filed: Jan. 24, 1992

[30] Foreign Application Priority Data

Feb. 8, 1991 [JP] Japan .................................. 3-017959

[51] Int. Cl.$^5$ .......................... F16F 5/00; B60G 15/06
[52] U.S. Cl. .............................. 267/140.12; 267/219; 267/140.15
[58] Field of Search ............... 267/140.1 F, 140.1 E, 267/140.1 R, 219, 220, 35, 141.2, 140.12, 140.11, 140.15; 188/267; 180/300, 312, 902; 248/562, 550, 636, 638

[56] References Cited

U.S. PATENT DOCUMENTS

| | | | |
|---|---|---|---|
| 4,909,489 | 3/1990 | Doi | 267/140.1 C |
| 4,923,178 | 5/1990 | Matsumoto et al. | 267/140.1 C |
| 4,936,555 | 6/1990 | Ishiyama et al. | 267/140.1 C |
| 4,971,299 | 11/1990 | Doi | 267/140.1 C |
| 5,029,825 | 7/1991 | Doi | 267/140.1 E |
| 5,037,071 | 8/1991 | Takano et al. | 267/219 X |
| 5,050,850 | 9/1991 | Noguchi et al. | 267/140.1 |
| 5,088,699 | 2/1992 | Doi | 267/140.1 E |
| 5,088,703 | 2/1992 | Takano et al. | 267/140.1 C |

FOREIGN PATENT DOCUMENTS 2-42227 2/1990 Japan .

Primary Examiner—Douglas C. Butler
Attorney, Agent, or Firm—Oliff & Berridge

[57] ABSTRACT

A vibration isolation apparatus comprises a first auxiliary fluid chamber communicating through a first restricted path with a main fluid chamber and a second auxiliary fluid chamber communicating through a second restricted path with the main fluid chamber. The second restricted path has electrode plates whose power supply condition is controlled by a control unit. Further, an electric viscous fluid is filled in the main fluid chamber, the first and second auxiliary fluid chambers, and the first and second restricted paths. When shake vibration is generated, the electrode plates are energized by the control unit so that none of the electric viscous fluid flows through the second restricted path. The electric viscous fluid causes a resonance of the fluid, and has flow resistance in the first restricted path to absorb the shake vibration. Idle vibration sets the first restricted path in the loading condition to prevent the electric viscous fluid from flowing through the restricted path. On the other hand, the electric viscous fluid flows through the second restricted path so that a resonance of the fluid is caused in the second restricted path to decrease the dynamic spring constant and absorb the idle vibration.

10 Claims, 16 Drawing Sheets

VIBRATION ISOLATION APPARATUS

BACKGROUND OF THE INVENTION

1. Field of the Invention

The present invention relates to a vibration isolation apparatus provided between a vibration producing portion and a vibration receiving portion in machinery such as vehicles, general industrial machinery and so on, to absorb vibration from the vibration producing portion.

2. Description of the Related Art

A vibration isolation apparatus is used in a vehicle as an engine mount between an engine and a vehicle body for absorbing vibration generated by the engine. This type of vibration isolation apparatus is equipped with a plurality of fluid chambers which can expand and contract and are connected by restricted paths. In the vibration isolation apparatus, vibration of the engine transmitted to one of the fluid chambers causes the fluid to be displaced into the other fluid chamber. The displacement of the fluid meets with a flow resistance so that the vibration is absorbed.

The engine vibrates in various modes of vibration. For example, a shake vibration is generated when the vehicle is traveling at speeds of about 70 to 80 km/hr, and an idle vibration is generated when the engine idles. Frequency range of the idle vibration is 20 to 40 Hz while that of the shake vibration is 8 to 15 Hz. Therefore, vibration frequencies at different vibration modes of the engine vary.

A conventional vibration isolation apparatus, however, can only be effective in a specific range of vibrational frequency which is determined by the sectional area and length of a restricted path of the device, and may not be effective for absorbing vibration in a frequency range other than the specific range. Therefore, the conventional vibration isolation apparatus does not effectively absorb idle vibration when the device is adjusted for effective absorption of shake vibration. Conversely, it does not effectively absorb shake vibration when the device is adjusted for effective absorption of idle vibration.

SUMMARY OF THE INVENTION

In view of the facts set forth above, it is an object of the present invention to provide a vibration isolation apparatus which can effectively absorb vibrations of a wide range of frequencies.

The vibration isolation apparatus of the present invention comprises a first cylindrical member connected to one of a vibration producing portion and a vibration receiving portion, a second cylindrical member connected to the other of the vibration producing portion and the vibration receiving portion, a main fluid chamber provided between the first and second cylindrical members and expanding and contracting by vibration, a first auxiliary fluid chamber communicating through a first restricted path with the main fluid chamber, a first expansion and contraction means forming a part of a partition of the first auxiliary fluid chamber, a second auxiliary fluid chamber communicating with the main fluid chamber through a second restricted path having a flow resistance less than that of the first restricted path, a second expansion and contraction means forming a part of a partition of the second auxiliary fluid chamber, having a larger fluid pressure resistance than the first expansion and contraction means, an electric viscous fluid which is filled in the above-mentioned main fluid chamber, the first auxiliary fluid chamber, and the second auxiliary fluid chamber, and whose viscosity varies according to an electric field intensity applied thereto, electrodes arranged on at least one of the above-mentioned first and second restricted paths to energize the above-mentioned electric viscous fluid.

According to the present invention, if the electrodes are provided only for the first restricted path and a low frequency vibration such as a shake vibration is caused, the fluid pressure resistance of the expansion and contraction means which forms a partition of the second auxiliary fluid chamber is greater than that of the expansion and contraction means which forms a partition of the first auxiliary fluid chamber. Therefore, the electric viscous fluid flows through the first restricted path, resonates and encounters flow resistance in the first restricted path so that a good damping characteristic can be generated so as to absorb the vibration. At this time, maximum damping force according to the desired frequency can be obtained by adjusting the magnitude of the power supply (the applied voltage), which may be 0, to the above-mentioned electrodes.

Further, when a high frequency vibration such as an idle vibration is caused, the first restricted path is set in the loading condition regardless of the condition of the power supply of the electrodes. Thus the electric viscous fluid does not flow through the first restricted path. Accordingly, the second expansion and contraction means which forms the second auxiliary fluid chamber expands and contracts while pressure increases in the main fluid chamber, so that the electric viscous fluid flows through the second restricted path. As a result, the electric viscous fluid causes resonance of the fluid in the second restricted path to decrease the dynamic spring constant and absorb the vibration.

According to the present invention, if the electrodes are provided only for the second restricted path and a low frequency vibration such as a shake vibration is caused, the above-mentioned electrodes are energized. Consequently, the electric viscous fluid does not flow through the second restricted path. As a result, the electric viscous fluid flows through the first restricted path, resonates and encounters flow resistance in the first restricted path so that a good damping characteristic can be generated so as to absorb the vibration.

Furthermore, when high frequency vibration such as an idle vibration is caused, the above-mentioned electrodes are not energized. In this case, the first restricted path is set in the loading condition so that the electric viscous fluid does not flow through the first restricted path. Accordingly, the second expansion and contraction means which forms the second auxiliary fluid chamber is expands and contracts while pressure increases in the main fluid chamber, so that the electric viscous fluid flows through the second restricted path. As a result, the electric viscous fluid causes a resonance of the fluid in the second restricted path to decrease the dynamic spring constant and absorb the vibration. Additionally, in this case, the resonance characteristic can be slightly varied by applying a very small voltage to the above-mentioned electrodes.

According to the present invention, if the electrodes are respectively provided for the first and second restricted paths and a low frequency vibration such as a shake vibration is caused, at least the electrodes of the second restricted path are energized. Therefore, the electric viscous fluid does not flow through the second restricted path. Consequently, the electric viscous fluid flows through the first restricted path, causes a resonance of the fluid and encounters flow resistance in the first restricted path so that a good damping characteristic can be obtained so as to absorb the vibration. At this time, maximum damping force according to the desired frequency can also be obtained by adjusting the magnitude of the power supply (the applied voltage), which may be 0, to the electrodes of the first restricted path.

Further, when a high frequency vibration such as an idle vibration is caused, at least the electrodes of the second restricted path are not energized. In this case, the first restricted path is set in the loading condition regardless of the condition of the power supply of the electrodes of the first restricted path. Thus the electric viscous fluid does not flow through the first restricted path. Accordingly, the second expansion and contraction means which forms the second auxiliary fluid chamber expands and contracts while pressure increases in the main fluid chamber, so that the electric viscous fluid flow through the second restricted path. As a result, the electric viscous fluid causes a resonance of the fluid in the second restricted path to decrease the dynamic spring constant and absorb the vibration. Additionally, in this case, the resonance characteristic can be slightly varied by applying a very small voltage to the electrodes of the second restricted path.

As can be understood from the above discussion, the vibration isolation apparatus of the invention has a superior effect in that the device can effectively absorb vibrations with different frequencies.

DESCRIPTION OF THE PREFERRED EMBODIMENTS

FIGS. 1 to 4 show a first embodiment of a vibration isolation apparatus 10 of the present invention.

Figure 2:
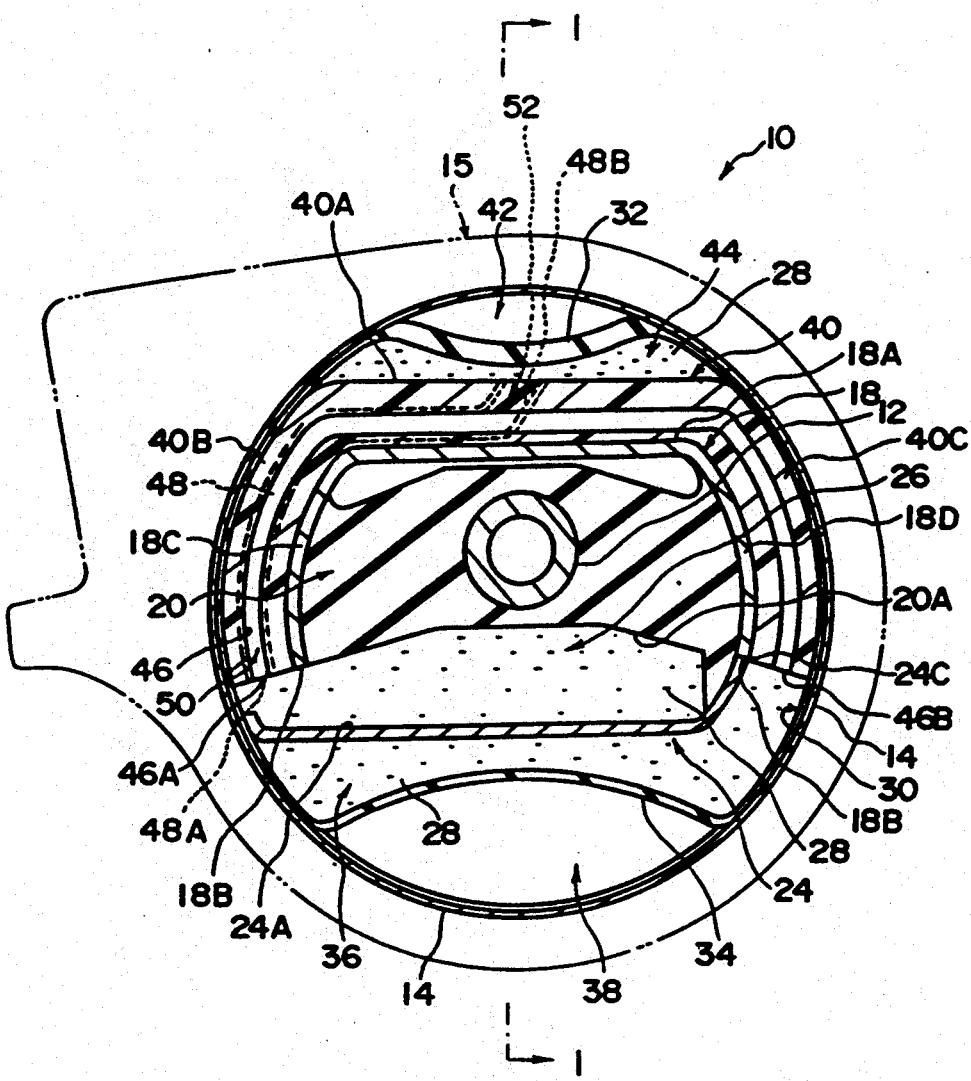
FIG. 2 is a sectional view taken along line 2—2 of FIG. 1, illustrating the first embodiment of the vibration isolation apparatus of the present invention.

As shown in FIG. 2, the vibration isolation apparatus 10 has an inner cylinder 12, serving as a first cylindrical member, and an outer cylinder 14, serving as a second cylindrical member, which are arranged such that their axes extend in the same direction. In the first embodiment, the inner cylinder 12 is connected to an engine serving as a vibration producing portion via a bracket (not shown). The outer cylinder 14 is connected via a bracket 15 to a vehicle body (not shown) serving as a vibration receiving portion.

Figure 3:
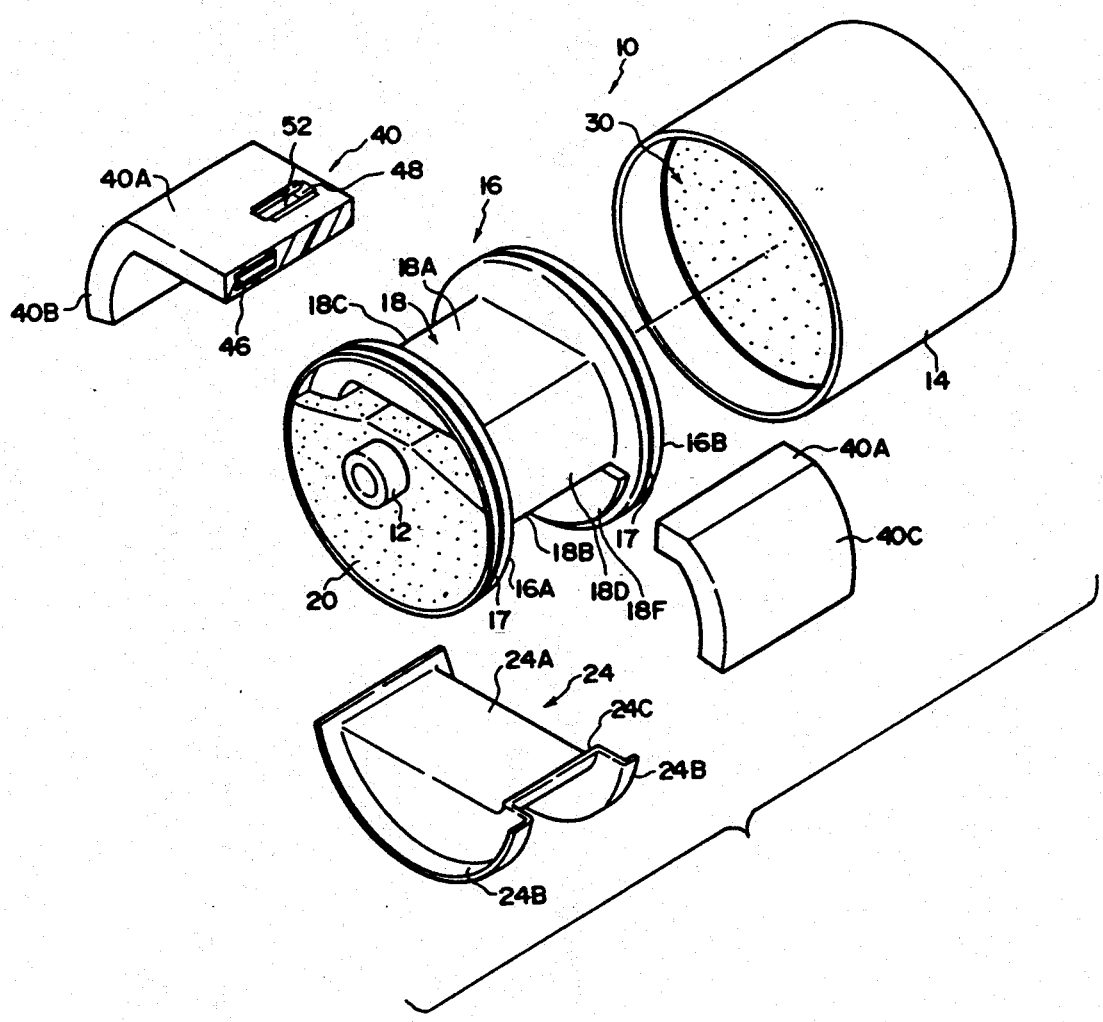
FIG. 3 is an exploded perspective view illustrating the first embodiment of the vibration isolation apparatus of the present invention (with an orifice member shown in section at an intermediate position)
Figure 4:
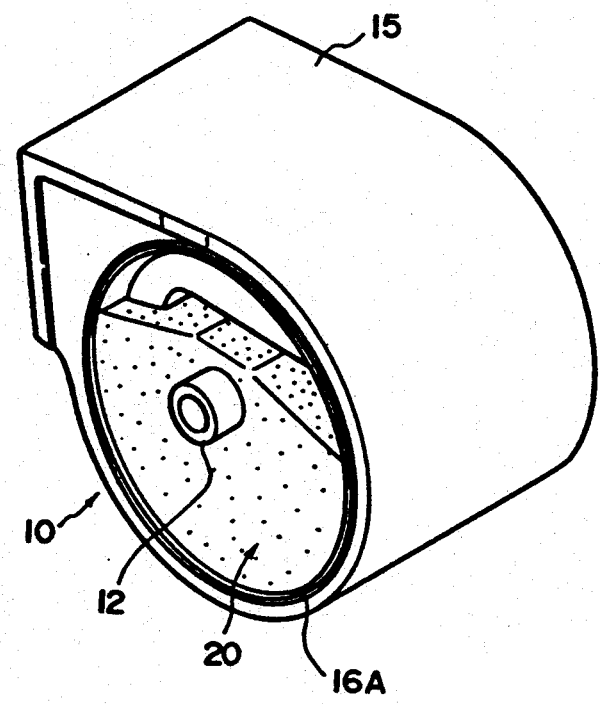
FIG. 4 is a perspective view illustrating overall construction of the vibration isolation apparatus with a bracket mounted on an outer cylinder.

As shown in FIG. 3, an intermediate cylinder 16 is arranged between the inner cylinder 12 and the outer cylinder 14 coaxially with the outer cylinder 14. Large diameter portions 16A and 16B, which have enlarged diameters and are ring-shaped, are formed at both axial ends of the intermediate cylinder 16. Grooves are formed in the circumferential direction on outer peripheries of the large diameter portions 16A and 16B. O rings 17 are accommodated in the grooves to ensure reliable sealing between the intermediate cylinder 16 and the outer cylinder 14 into which the intermediate cylinder 16 is inserted.

The intermediate portion in the axial direction of the above-mentioned intermediate cylinder 16 is defined as a small diameter portion 18 having a reduced diameter. The small diameter portion 18 has a plane portion 18A, which is provided along a tangent line as a part of the small diameter portion 18, and a notch portion 18B, which is formed on the side opposite to the plane portion 18A with respect to the inner cylinder 12, as shown in FIG. 2. Furthermore, arc portions 18C, 18D are formed between the plane portion 18A and the notch portion 18B of the small diameter portion 18. A main rubber body 20 serving as an elastic body is provided between the inner cylinder 12 and the intermediate cylinder 16. The main rubber body 20 is bonded by vulcanization to both an outer periphery of the inner cylinder 12 and an inner periphery of the intermediate cylinder 16.

Figure 1:
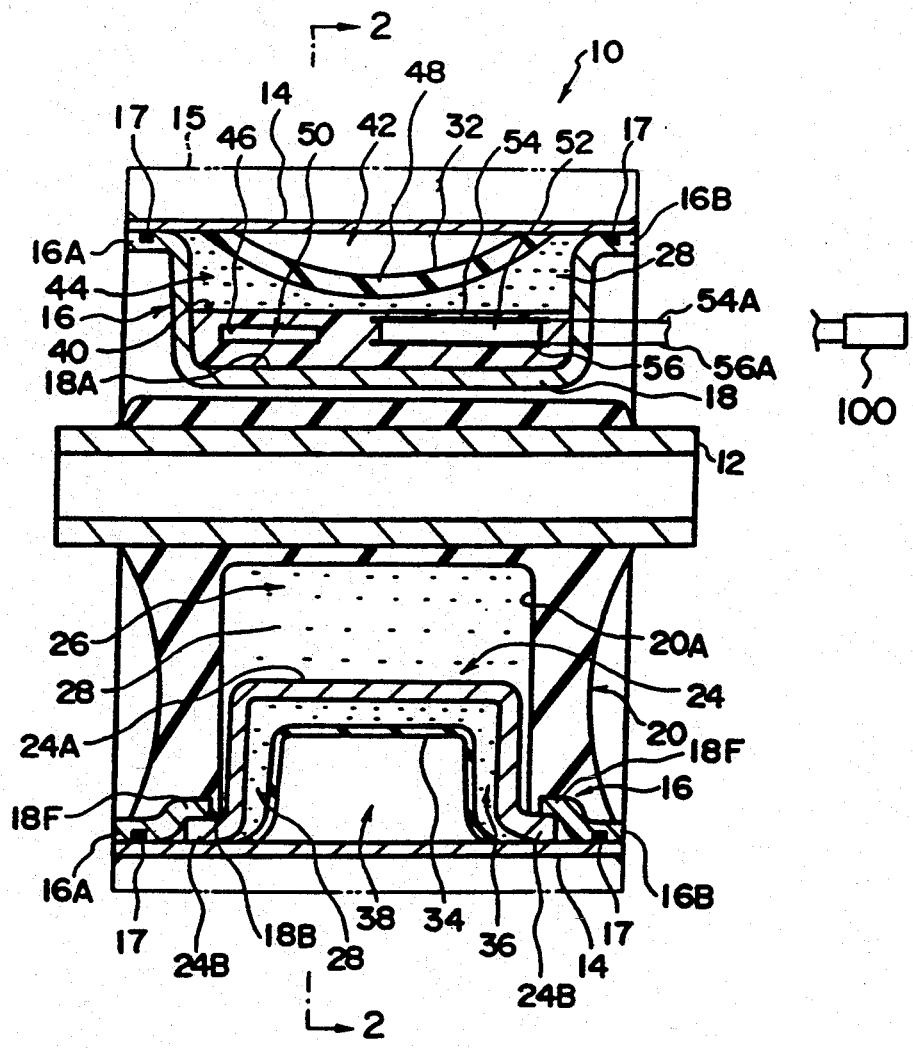
FIG. 1 is a sectional view taken along line 1—1 of FIG. 2, illustrating a first embodiment of a vibration isolation apparatus of the present invention.

As shown in FIGS. 1 and 2, the main rubber body 20 has a notch portion 20A which is concave toward the inner cylinder 12. A partition plate 24 which is substantially hat-shaped in section, is provided in the notch portion 20A as shown in FIG. 1. Flange portions 24B of the partition plate 24 are rigidly fixed between step portions 18F, provided on the small diameter portion 18 of the intermediate cylinder 16, and the outer cylinder 14. Therefore, the notch portion 20A and the partition plate 24 define a main fluid chamber 26. The main fluid chamber 26 is filled with electric viscous fluid 28. Further, as shown in FIG. 3, an opening portion (a concave portion) 24C is provided at one end of the partition plate 24 in the peripheral direction.

As shown in FIG. 2, a thin rubber membrane 30 is bonded by vulcanization to the inner periphery of the outer cylinder 14. A part of the thin rubber membrane 30 is not bonded by vulcanization to the inner periphery of the outer cylinder 14 and forms a diaphragm 34 serving as a first expansion and contraction means. Additionally, a rubber membrane 32 serving as a second expansion and contraction means is formed such that, as in the case of the diaphragm 34, it is not bonded by vulcanization on the inner periphery of the outer cylinder 14 on the side opposite to the diaphragm 34 with respect to the inner cylinder 12. The rubber membrane 32 is formed to be thicker than the diaphragm 34 so as to ensure greater pressure resistance to the fluid.

As shown in FIGS. 2 and 3, a member for orifice 40, which is formed of an insulator such as a synthetic resin and is substantially C-shaped, is arranged on the outer periphery of the small diameter portion 18 of the intermediate cylinder 16. The intermediate portion of the member for orifice 40 in the peripheral direction defines a plane portion 40A contacting with the plane portion 18A of the small diameter portion 18. From both side portions of the plane portion 40A, arc portions 40B, 40C are formed and contact with the arc portions 18C, 18D of the above-mentioned small diameter portion 18. A first auxiliary fluid chamber 36 is formed as shown in FIG. 2 by the diaphragm 34, the partition plate 24, and the arc portion 40C of the orifice member 40. The first auxiliary fluid chamber 36 is also filled with electric viscous fluid 28 as in the case of the main fluid chamber 26. Further, an air chamber 38, formed between the diaphragm 34 and the outer cylinder 14, allows expansion of the diaphragm 34. The air chamber 38 may communicate with outside air through communication means such as a hole which is provided in the outer cylinder 14 which serves as a part of the partition of the air chamber 38.

A second auxiliary fluid chamber 44 is formed by the plane portion 40A of the orifice member 40 and the above-mentioned rubber membrane 32 on the side opposite to the first auxiliary fluid chamber 36 with respect to the inner cylinder 12. The second auxiliary fluid chamber 44 is filled with the electric viscous fluid 28 as in the case of the main fluid chamber 26. Additionally, an air chamber 42 is formed between the rubber membrane 32 and the outer cylinder 14. The air chamber 42 may be connected to outside air through communication means such as a hole which is provided in the outer cylinder 14 which serves as a part of the partition of the air chamber 42.

As shown in FIGS. 2 and 3, two paths 46, 48 are provided in the above-mentioned member for orifice 40. The path 46, as shown in FIG. 2, passes through the orifice member 40 through the arc portion 40B, the plane portion 40A, and the arc portion 40C in a substantial C-shape. Moreover, the path 46 is connected to the main fluid chamber 26 through an opening portion 46A which is longitudinally formed at one end of the path 46, and to the first auxiliary fluid chamber 36 through an opening portion 46B which is longitudinally formed at the other end of the path 46. The sectional area of the path 46, as shown in FIG. 1, is considerably smaller than that of the path 48 so as to increase the flow resistance. Thus, the path 46 is defined as a shake orifice 50 serving as a first restricted path. The above-mentioned path 48, which is formed on a part of the arc portion 40B and the plane portion 40A of the member for orifice 40, is connected to the main fluid chamber 26 through an opening portion 48A which is longitudinally formed at one end of the path 48. Moreover, the path 48 is connected to the second auxiliary fluid chamber 44 through an opening portion 48B which is longitudinally formed at the other end of the path 48. Accordingly, the path 48 is defined as an idle orifice 52 serving as a second restricted path.

As shown in FIG. 1, electrode plates 54, 56 are mounted on both side surfaces of the path 48 such that they are opposed to each other and are connected through conductive lines 54A, 56A to a control unit 100. In this embodiment, the electrode plates 54, 56 are set respectively as positive and negative electrodes. The electric viscous fluid 28 may be a mixture which, for example, consists of 40 to 60 wt % of silicic acid, 30 to 50 wt % of a low-boiling point organic phase, 50 to 10 wt % of water, and 5 wt % of a dispersion medium. For example, an isododekan can be used as the electric viscous fluid 28. This electric viscous fluid has not only normal viscosity of the fluid in fluid pressure resistance when the electric viscous fluid is not energized through the electrodes, but also has a distinctive characteristic in that the viscosity of the fluid is varied to be solidified according to the strength of the electric field when the electric viscous fluid is energized.

The operation of the first embodiment of the present invention will be described.

The outer cylinder 14 is connected through the bracket 15 to the body of the vehicle (not shown), and the inner cylinder 12 is connected through a bracket (not shown) to the engine. Due to the weight of the vehicle engine, the inner cylinder 12 causes the main rubber body 20 to deform elastically, and the main rubber body 20 moves downward relative to the inner cylinder 12 in the state shown in FIG. 1 so that the inner cylinder 12 and the outer cylinder 14 are substantially coaxial.

Shake vibration of a comparatively low frequency, e.g., about 8 to 15 Hz, and a comparatively large amplitude, e.g., about ±1 mm, is generated when the vehicle is traveling at speeds of 70 to 80 km/hr. At this time, the control unit 100 energizes the electrode plates 54, 56, which are provided in the idle orifice 52, in order to increase the viscosity of the electric viscous fluid 28 through the idle orifice 52. As a result, the electric viscous fluid 28 is prevented from flowing through the idle orifice 52. Accordingly, the electric viscous fluid 28 flows only through the shake orifice 50, causes a resonance of the electric viscous fluid 28 and has flow resistance in the shake orifice 50 so as to absorb the shake vibration.

Next, idle vibration of comparatively high frequency, e.g., about 20 to 40 Hz, and comparatively small amplitude, e.g., about ±0.3 mm, is generated when the engine idles or the vehicle is traveling at a speed of about 5 km/hr. At this time, the shake orifice 50 with the small sectional area is set in the loading condition due to the idle vibration regardless of the condition of the power supply of the electrode plates 54, 56 of the idle orifice 52. Thus, the electric viscous fluid 28 does not flow through the shake orifice 50. Accordingly, pressure becomes high in the main fluid chamber 26 so that the electric viscous fluid 28 flows through the idle orifice 52 to vibrate the rubber membrane 32. As a result, resonance of the fluid is caused in the idle orifice 52 to decrease the dynamic spring constant and absorb the idle vibration.

Figure 5:
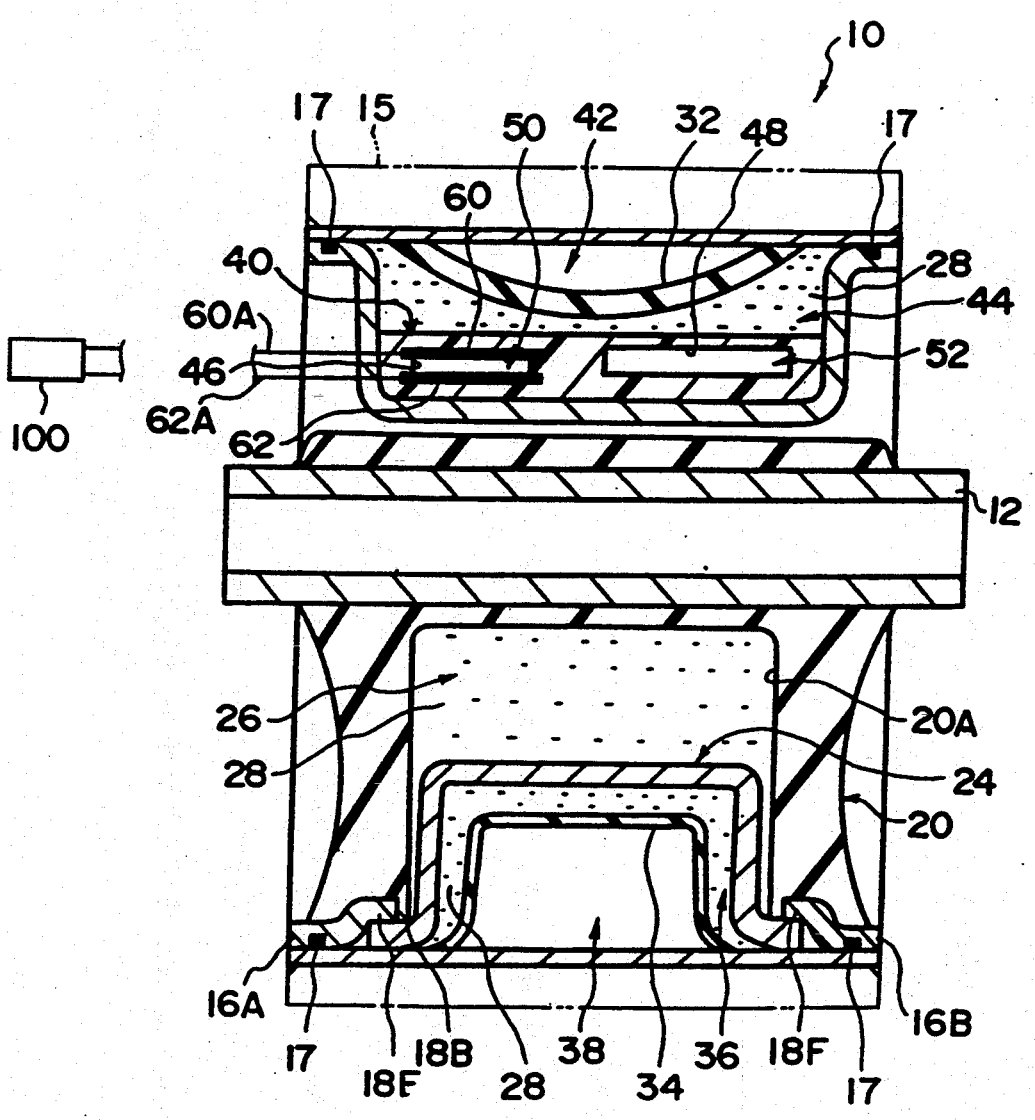
FIG. 5 is a sectional view corresponding to FIG. 1, illustrating a second embodiment of a vibration isolation apparatus of the present invention.

FIG. 5 shows a second embodiment of the vibration isolation apparatus 10 of the present invention. The structure and numerals remain identical to those shown in the first embodiment. Therefore, the same numerals are used, and description of similar structures is omitted. As shown in FIG. 5, electrode plates 60, 62 are mounted on both side surfaces of the path 46 such that they are opposed to each other and connected through conductive lines 60A, 62A to a control unit 100. In this embodiment, the electrode plates 60, 62 are set respectively as positive and negative electrodes. Other structures are identical to those of the first embodiment.

The operation of the second embodiment of the present invention will be described.

The electrode plates 60, 62 are provided in the shake orifice 50 and are not energized when shake vibration is generated. Thus, the electric viscous fluid 28 flows through the shake orifice 50. This flow of the electric viscous fluid 28 through the shake orifice 50 prevents pressure in the main fluid chamber 26 from increasing. Accordingly, the thick-walled rubber membrane 32 is not vibrated so that the electric viscous fluid 28 does not flow through the idle orifice 52. As a result, resonance of the electric viscous fluid 28 is caused in the shake orifice 50 and a flow of the electric viscous fluid 28 has flow resistance so that a good damping characteristic can be obtained to absorb the shake vibration.

The electrode plates 60, 62 are energized by the control unit 100 when idle vibration is generated. The idle vibration sets the shake orifice 50 in the loading condition. In addition, the energized electrode plates 60, 62 cause high viscosity of the electric viscous fluid 28 in the shake orifice 50, thereby further ensuring that the electric viscous fluid 28 does not flow through the shake orifice 50. Consequently, high pressure is generated in the main fluid chamber 26 so that the electric viscous fluid 28 flows through the idle orifice 52 to vibrate the rubber membrane 32. As a result, resonance of the electric viscous fluid 28 is caused in the idle orifice 52 to decrease the dynamic spring constant and absorb the idle vibration.

Figure 6:
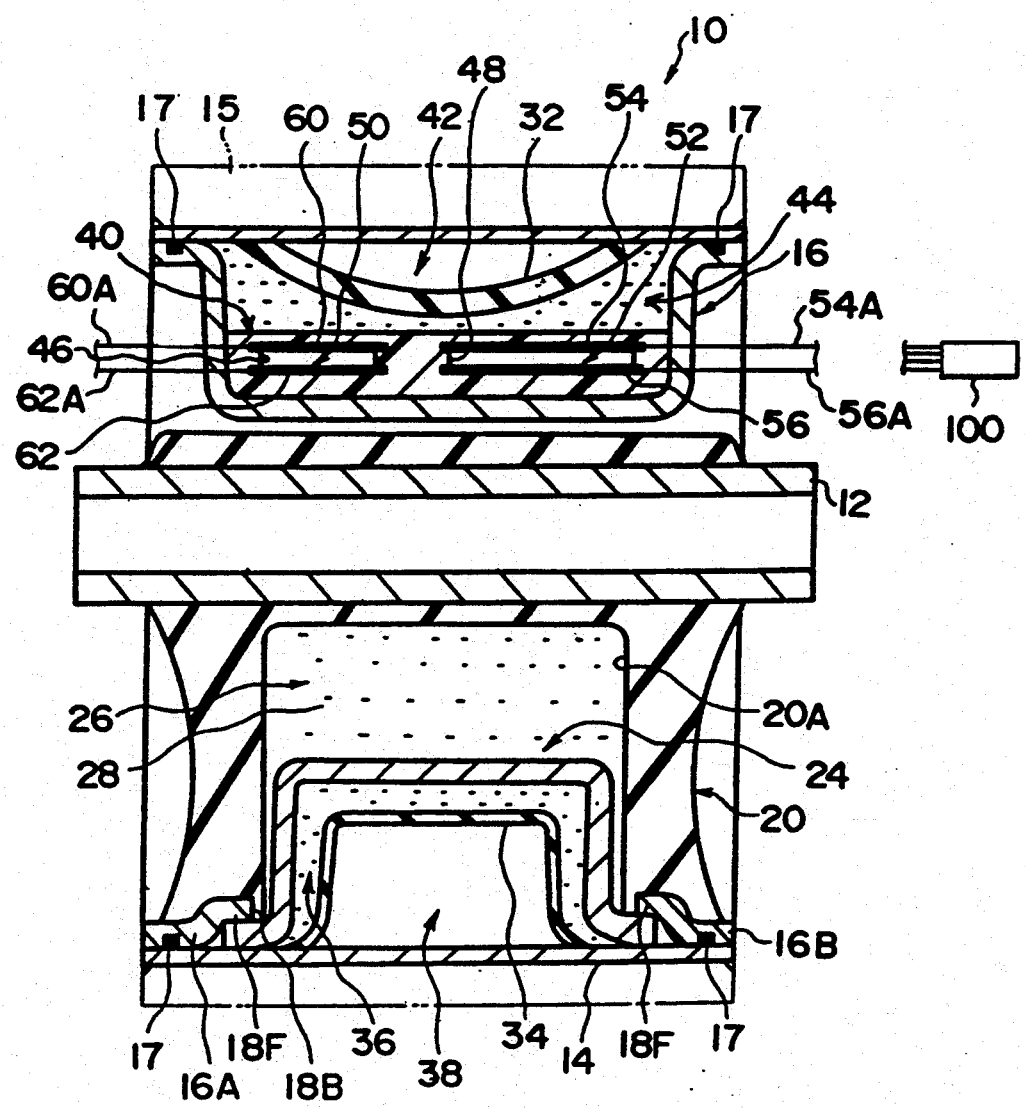
FIG. 6 is a sectional view corresponding to FIG. 1, illustrating a third embodiment of a vibration isolation apparatus of the present invention.

FIG. 6 shows a third embodiment of the vibration isolation apparatus 10 of the present invention. The general structure and numerals remain identical to those shown in the first embodiment. Therefore, the same numerals are used, and description of similar structures is omitted. As shown in FIG. 6, electrode plates 54, 56 are mounted on both side surfaces of the path 48 in such a manner that they are opposed to each other. Electrode plates 60, 62 are mounted on both side surfaces of the path 46 in such a manner that they are opposed to each other. Other structures are identical to those of the first embodiment.

The operation of the third embodiment of the present invention will be described.

The control unit 100 only energizes the electrode plates 54, 56 which are provided in the idle orifice 52 when shake vibration is generated. The electric viscous fluid 28 thus becomes high in viscosity in the idle orifice 52. Therefore, the electric viscous fluid 28 does not flow through the idle orifice 52. Accordingly, the electric viscous fluid 28 flows through the shake orifice 50. As a result, resonance of the electric viscous fluid 28 is caused in the shake orifice 50 and a movement of the electric viscous fluid 28 has flow resistance so that a good damping characteristic can be obtained to absorb the shake vibration.

The control unit 100 only energizes the electrode plates 60, 62 which are provided in the shake orifice 50 when idle vibration is generated. The idle vibration sets the shake orifice 50 in the loading condition. In addition, the energized electrode plates 60, 62 cause high viscosity of the electric viscous fluid 28 in the shake orifice 50 thereby further ensuring that the electric viscous fluid 28 does not flow through the shake orifice 50. Consequently, high pressure is generated in the main fluid chamber 26 so that the electric viscous fluid 28 flows through the idle orifice 52 to vibrate the rubber membrane 32. As a result, resonance of the electric viscous fluid 28 is caused in the idle orifice 52 to decrease the dynamic spring constant and absorb the idle vibration.

Figure 7:
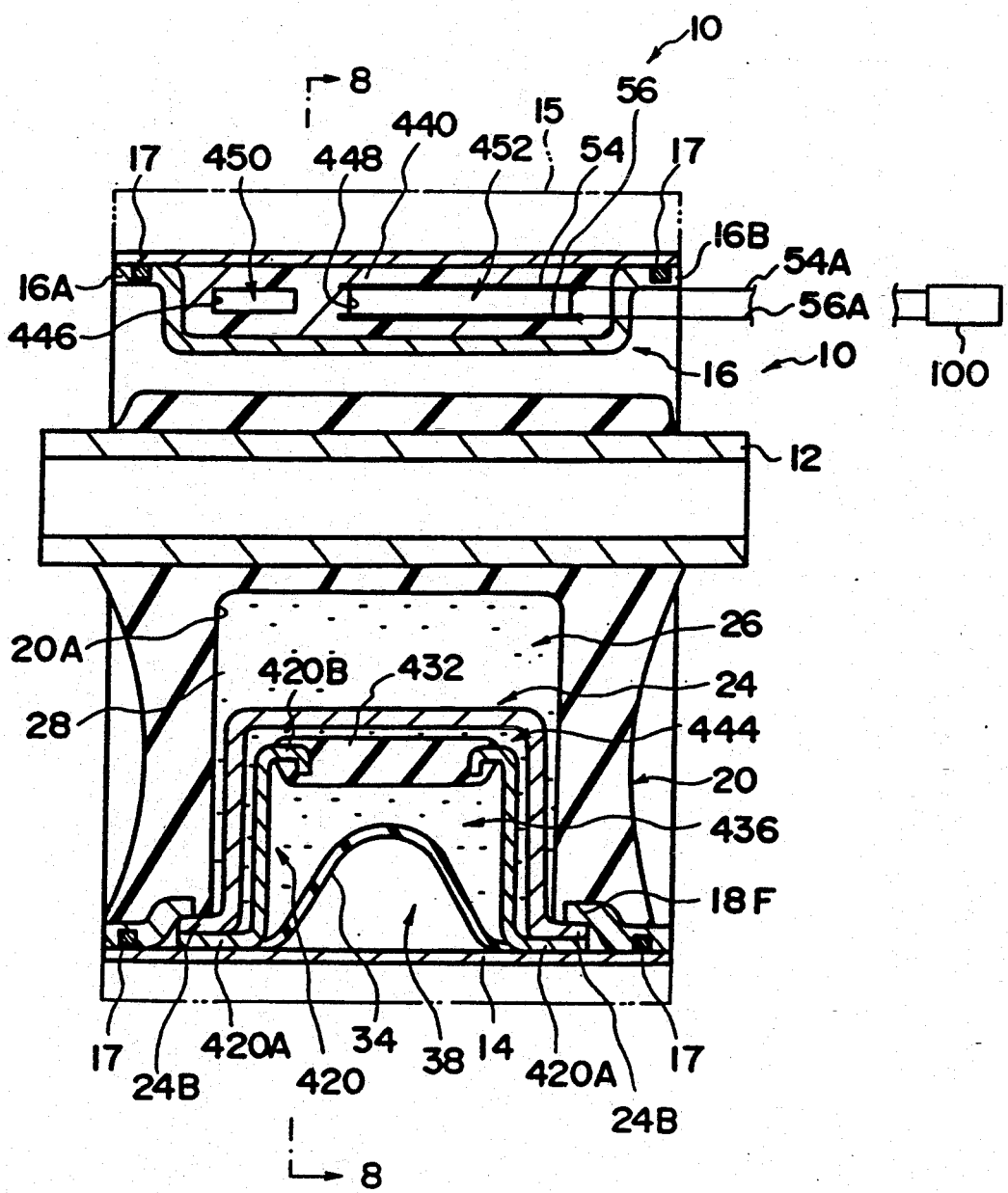
FIG. 7 is a sectional view taken along line 7—7 of FIG. 8, illustrating a fourth embodiment of a vibration isolation apparatus of the present invention.
Figure 8:
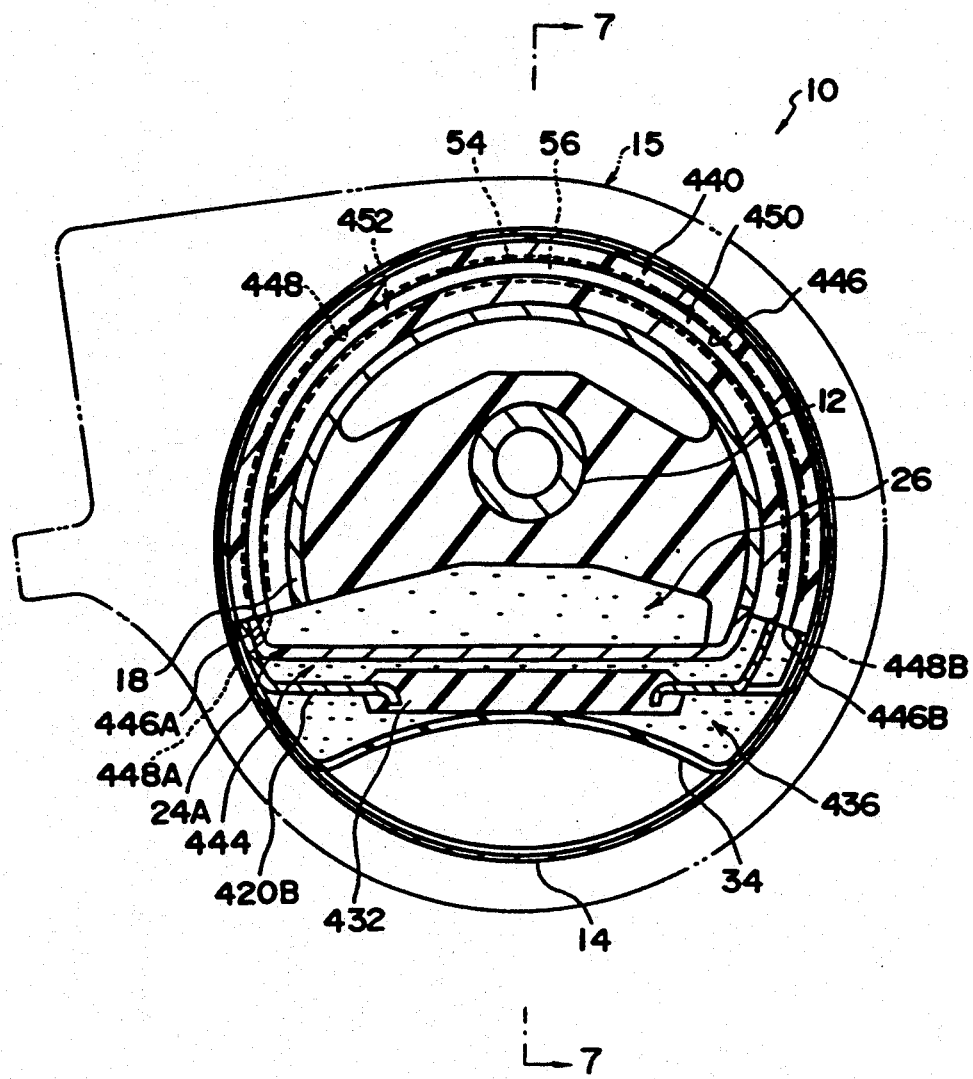
FIG. 8 is a sectional view taken along line 8—8 of FIG. 7, illustrating the fourth embodiment of the vibration isolation apparatus of the present invention.
Figure 9:
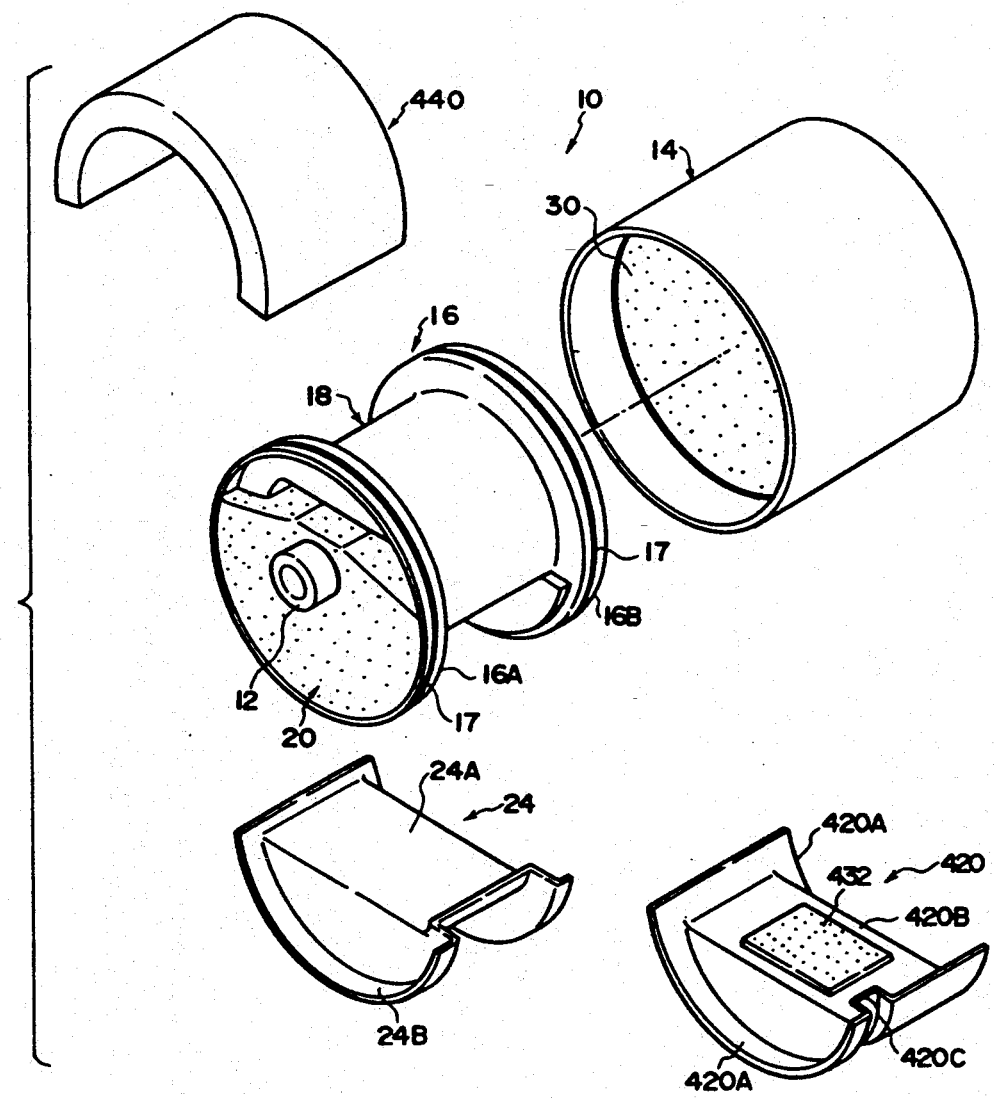
FIG. 9 is an exploded perspective view illustrating the fourth embodiment of the vibration isolation apparatus of the present invention.

FIGS. 7 to 9 show a fourth embodiment of the vibration isolation apparatus 10 of the present invention. The structure and numerals remain identical to those shown in the first embodiment. Therefore, the same numerals are used, and description of similar structures is omitted.

As shown in FIG. 7, a supporting plate 420 which is hat-shaped in section is located between the partition plate 24 and the diaphragm 34. Flange portions 420A of the supporting plate 420 are provided between the flange portions 24B of the above-mentioned partition plate 24 and the outer cylinder 14 so as to fix the supporting plate 420 rigidly. The supporting plate 420 has an opening portion on a top plate portion 420B thereof, which is blocked by a rubber membrane 432 having a thick wall. Accordingly, the supporting plate 420, the rubber membrane 432, and the diaphragm 34 define the first auxiliary fluid chamber 436. The supporting plate 420, the rubber membrane 432, and the partition plate 24 define the second auxiliary fluid chamber 444.

As shown in FIG. 9, the small diameter portion 18 of the intermediate cylinder 16 is provided in the form of an arc. An arc-shaped orifice member 440, which is formed of an insulator such as a synthetic resin, is placed on the small diameter portion 18.

As shown in FIG. 7, the outer periphery of the orifice member 440 has the same outside diameter as the large diameter portions 16A, 16B of the intermediate cylinder 16. Furthermore, paths 446 and 448 are provided in the orifice member 440 longitudinally along the peripheral direction of the orifice member 440.

As shown in FIG. 8, an opening portion 446A is provided at one longitudinal end of the path 446, and an opening portion 446B provided at the other longitudinal end of the path 446. The opening portion 446B corresponds to an opening portion 420C of the above-mentioned supporting plate 420 (see FIG. 9). The above-mentioned path 446 is connected through the opening portion (concave portion) 446A to the main fluid chamber 26, is connected through the opening portion 446B to the first auxiliary fluid chamber 436, and is thus defined as a shake orifice 450. Further, an opening portion 448A is provided at one longitudinal end of the path 448, and an opening portion 448B is provided at the other longitudinal end of the path 448. The path 448 is connected through the opening portion 448A to the main fluid chamber 26, is connected through the opening portion 448B to the second auxiliary fluid chamber 444, and is thus defined as an idle orifice 452. In addition, the above-mentioned electrode plates 54, 56 are mounted on both side surfaces of the path 448 in such a manner that they are opposed to each other. Other structures are identical to those of the first embodiment.

The operation of the fourth embodiment of the present invention will be described.

When shake vibration is generated, the control unit 100 energizes the electrode plates 54, 56, which are provided in the idle orifice 452, in order to increase the viscosity of the electric viscous fluid 28 in the idle orifice 452. As a result, the electric viscous fluid 28 is prevented from flowing through the idle orifice 452. Accordingly, the electric viscous fluid 28 flows only through the shake orifice 450 so that resonance of the electric viscous fluid 28 is caused in the shake orifice 450 and a flow of the electric viscous fluid 28 has flow resistance so as to absorb the shake vibration.

When idle vibration is generated, the electrode plates 54, 56, which are provided in the idle orifice 452, are not energized. On the other hand, since the idle vibration sets the shake orifice 450 in the loading condition, the electric viscous fluid 28 does not flow through the shake orifice 450. Accordingly, high pressure is generated in the main fluid chamber 26 so that the electric viscous fluid 28 flows through the idle orifice 452 to vibrate the rubber membrane 432. As a result, resonance of the fluid is caused in the idle orifice 452 to decrease the dynamic spring constant and absorb the vibration.

Figure 10:
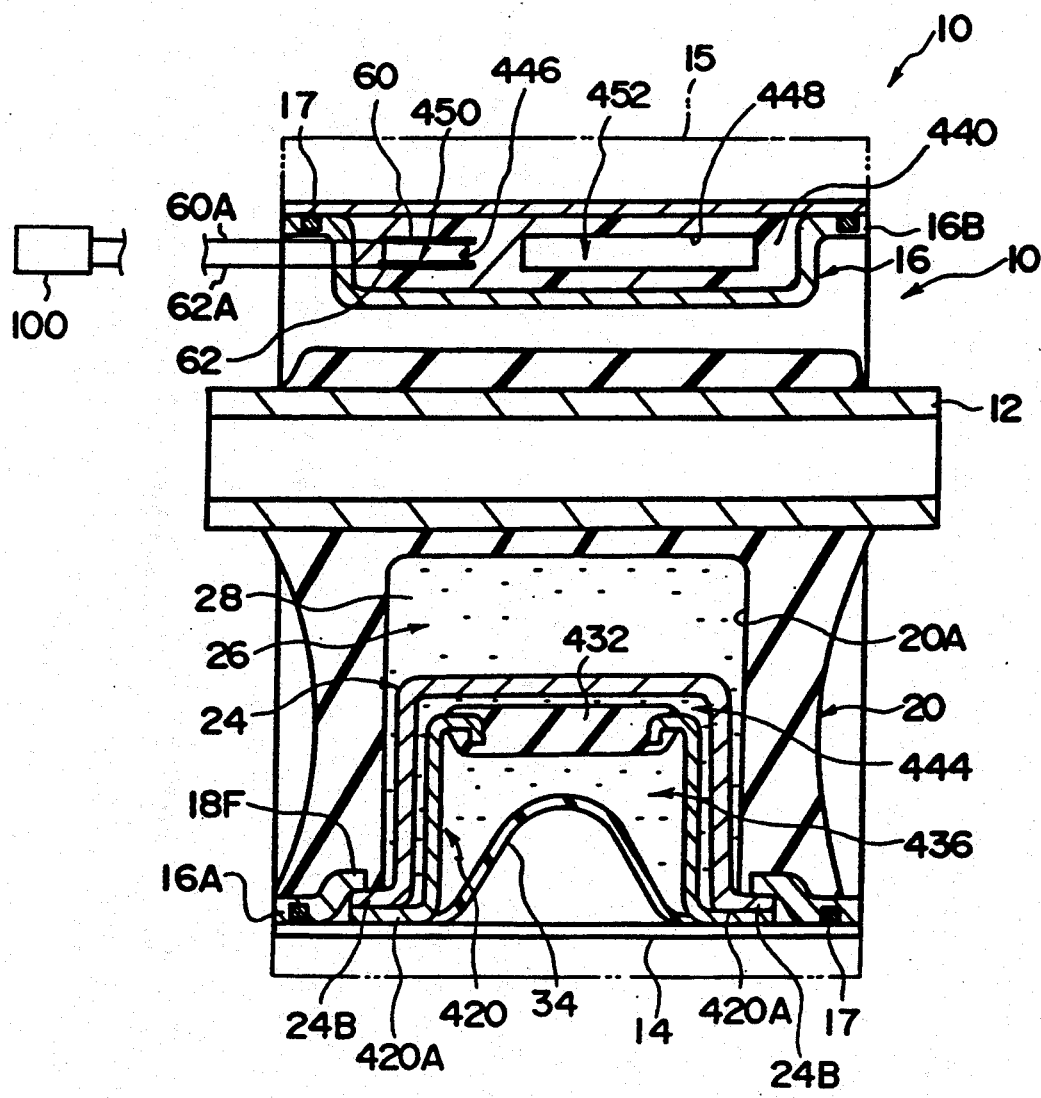
FIG. 10 is a sectional view corresponding to FIG. 1, illustrating a sixth embodiment of a vibration isolation apparatus of the present invention.

FIG. 10 shows a fifth embodiment of the vibration isolation apparatus 10 of the present invention. The structure and numerals remain identical to those shown in the fourth embodiment. Therefore, the same numerals are used, and description of similar structures is omitted.

As shown in FIG. 10, the electrode plates 60, 62 are mounted on both side surfaces of the path 446 in such a manner that they are opposed to each other. In addition, the electrode plates 60, 62 are connected through conductive lines 60A, 62A to the control unit 100. Other structures remain identical to those of the fourth embodiment.

The operation of the fifth embodiment of the present invention will be described.

The electrode plates 60, 62, which are provided in the shake orifice 450, are not energized when shake vibration is generated. The electric viscous fluid 28 thus flows through the shake orifice 450. On the other hand, the flow of the electric viscous fluid 28 through the shake orifice 450 prevents pressure in the main fluid chamber 26 from increasing. Accordingly, the thick-walled rubber membrane 432 hardly vibrates so that the electric viscous fluid 28 does not flow through the idle orifice 452. As a result, resonance of the electric viscous fluid 28 is caused in the shake orifice 450 and a flow of the electric viscous fluid 28 has flow resistance so that a good damping characteristic can be obtained to absorb the shake vibration.

The control unit 100 energizes the electrode plates 60, 62, provided in the shake orifice 450, when idle vibration is generated. The idle vibration sets the shake orifice 450 in the loading condition. In addition, the energized electrode plates 60, 62 cause high viscosity of the electric viscous fluid 28 in the shake orifice 450, thereby further ensuring that the electric viscous fluid 28 does not flow through the shake orifice 450. Consequently, high pressure is generated in the main fluid chamber 26 so that the electric viscous fluid 28 flows through the idle orifice 452 to vibrate the rubber membrane 432. As a result, resonance of the electric viscous fluid 28 is caused in the idle orifice 452 to decrease the dynamic spring constant and absorb the idle vibration.

Figure 11:
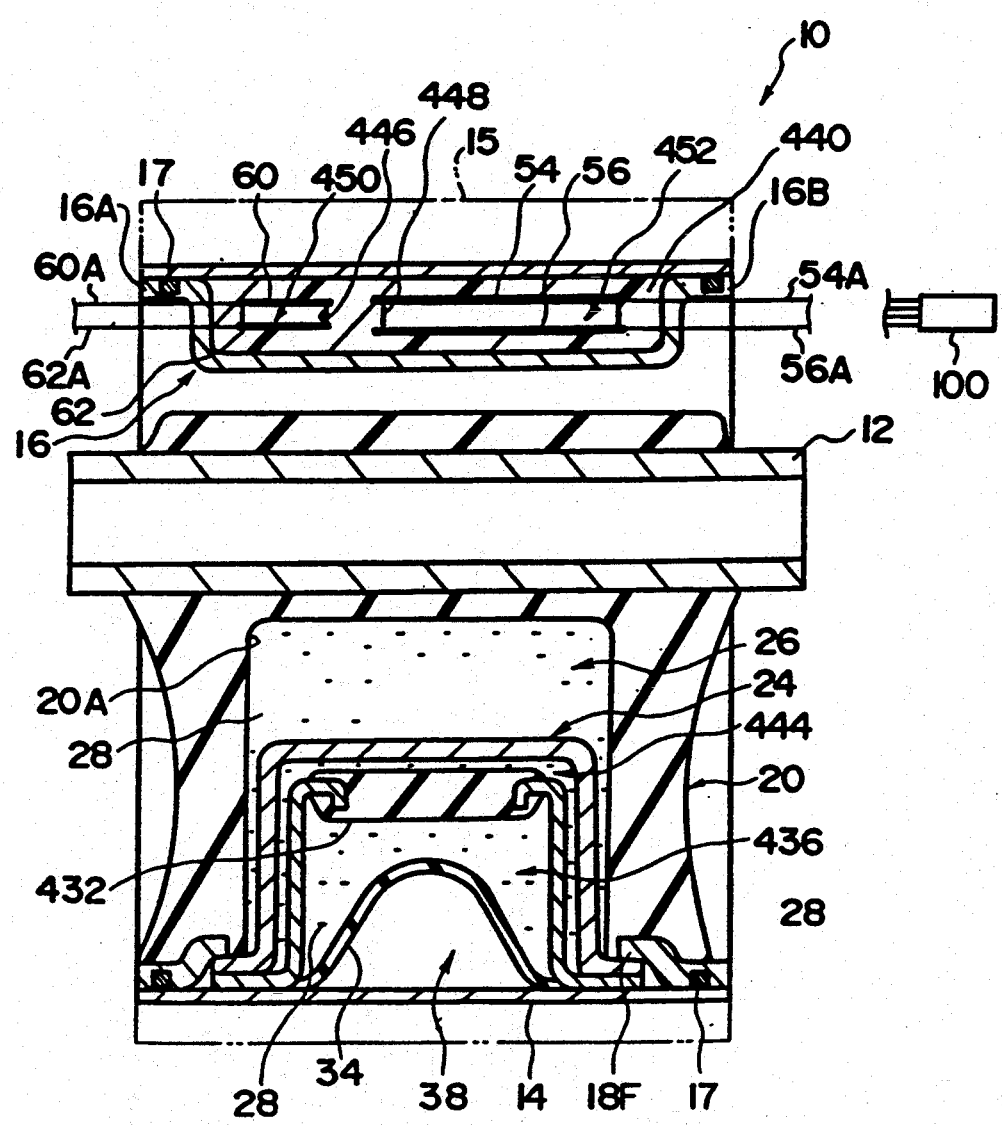
FIG. 11 is a sectional view corresponding to FIG. 1, illustrating a sixth embodiment of a vibration isolation apparatus of the present invention.

FIG. 11 shows a sixth embodiment of the vibration isolation apparatus 10 of the present invention. The structure and numerals remain identical to those shown in the fourth embodiment. Therefore, the same numerals are used, and description of similar structures is omitted.

As shown in FIG. 11, the above-mentioned electrode plates 54, 56 are mounted on both side surfaces of the path 448 in such a manner that they are opposed to each other. The electrode plates 60, 62 are mounted on both side surfaces of the path 446 in such a manner that they are opposed to each other. The electrode plates 54, 56 and the electrode plates 60, 62 are connected to the control unit 100 respectively through the conductive lines 54A, 56A and through the conductive lines 60A, 62A. Other structures remain identical to those of the fourth embodiment.

The operation of the sixth embodiment of the present invention will be described.

The control unit 100 only energizes the electrode plates 54, 56 which are provided in the idle orifice 452, when shake vibration is generated. The electric viscous fluid 28 has high viscosity in the idle orifice 452 and does not flow through the idle orifice 452. Accordingly, the electric viscous fluid 28 flows through the shake orifice 450. As a result, resonance of the electric viscous fluid 28 is caused in the shake orifice 450 and a flow of the electric viscous fluid 28 has flow resistance so that a good damping characteristic can be obtained to absorb the shake vibration.

The control unit 100 only energizes the electrode plates 60, 62 which are provided in the shake orifice 450, when idle vibration is generated. The idle vibration sets the shake orifice 450 in the loading condition. In addition, the applied electrode plates 60, 62 cause high viscosity of the electric viscous fluid 28 in the shake orifice 450, thereby further ensuring that the electric viscous fluid 28 does not flow through the shake orifice 450. Consequently, high pressure is generated in the main fluid chamber 26 so that the electric viscous fluid 28 flows through the idle orifice 452 to vibrate the rubber membrane 432. As a result, resonance of the electric viscous fluid 28 is caused in the idle orifice 452 to decrease the dynamic spring constant and absorb the idle vibration.

Figure 12:
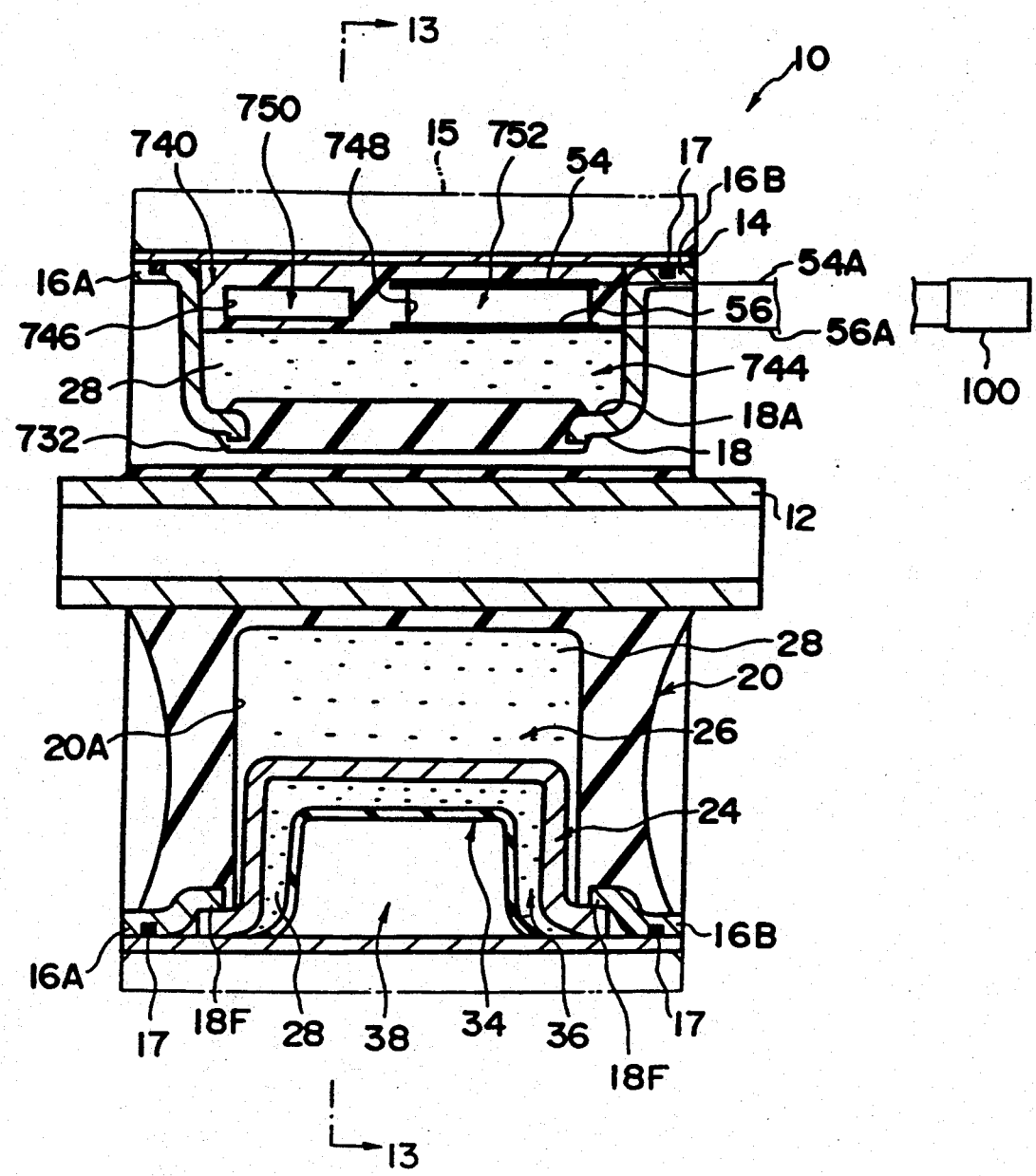
FIG. 12 is a sectional view taken along line 12—12 of FIG. 13, illustrating a seventh embodiment of a vibration isolation apparatus of the present invention.
Figure 13:
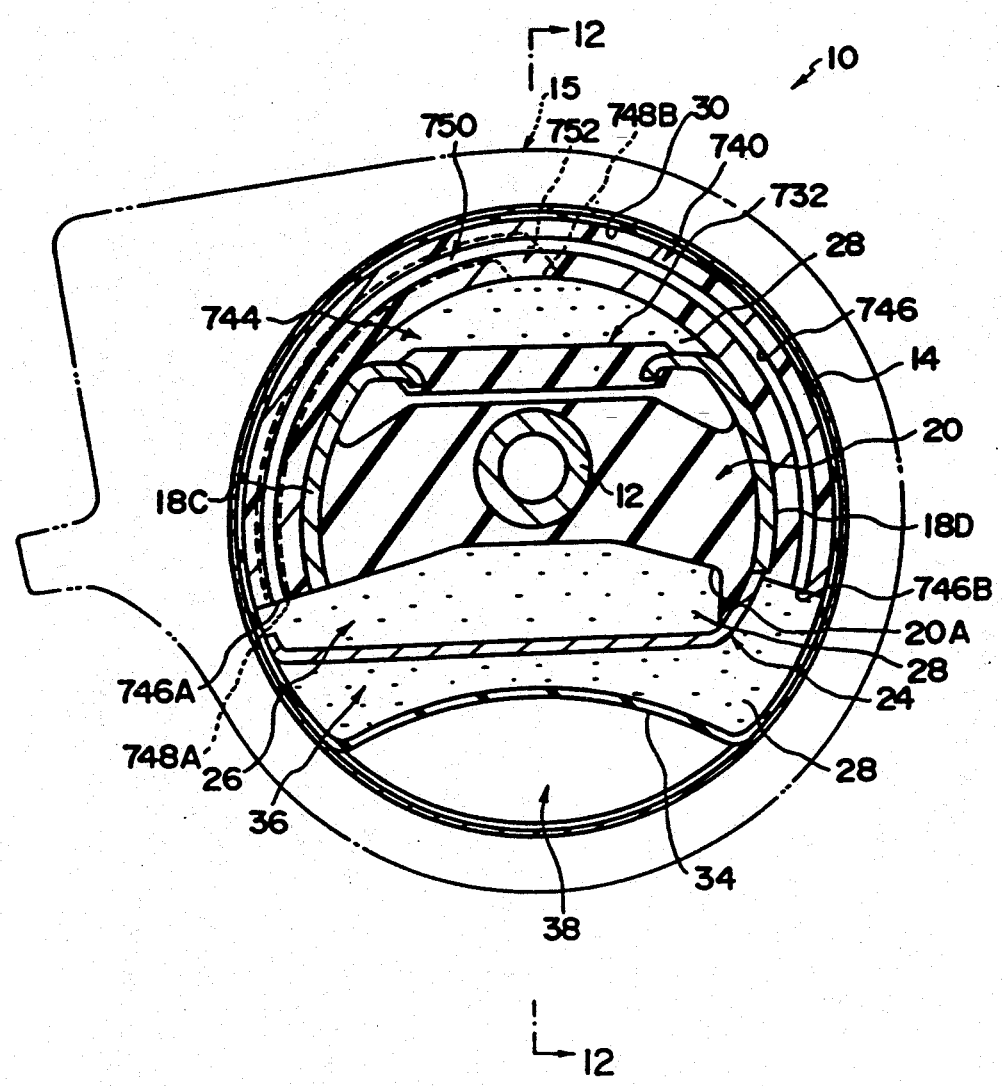
FIG. 13 is a sectional view taken along line 13—13 of FIG. 12, illustrating the seventh embodiment of the vibration isolation apparatus of the present invention.
Figure 14:
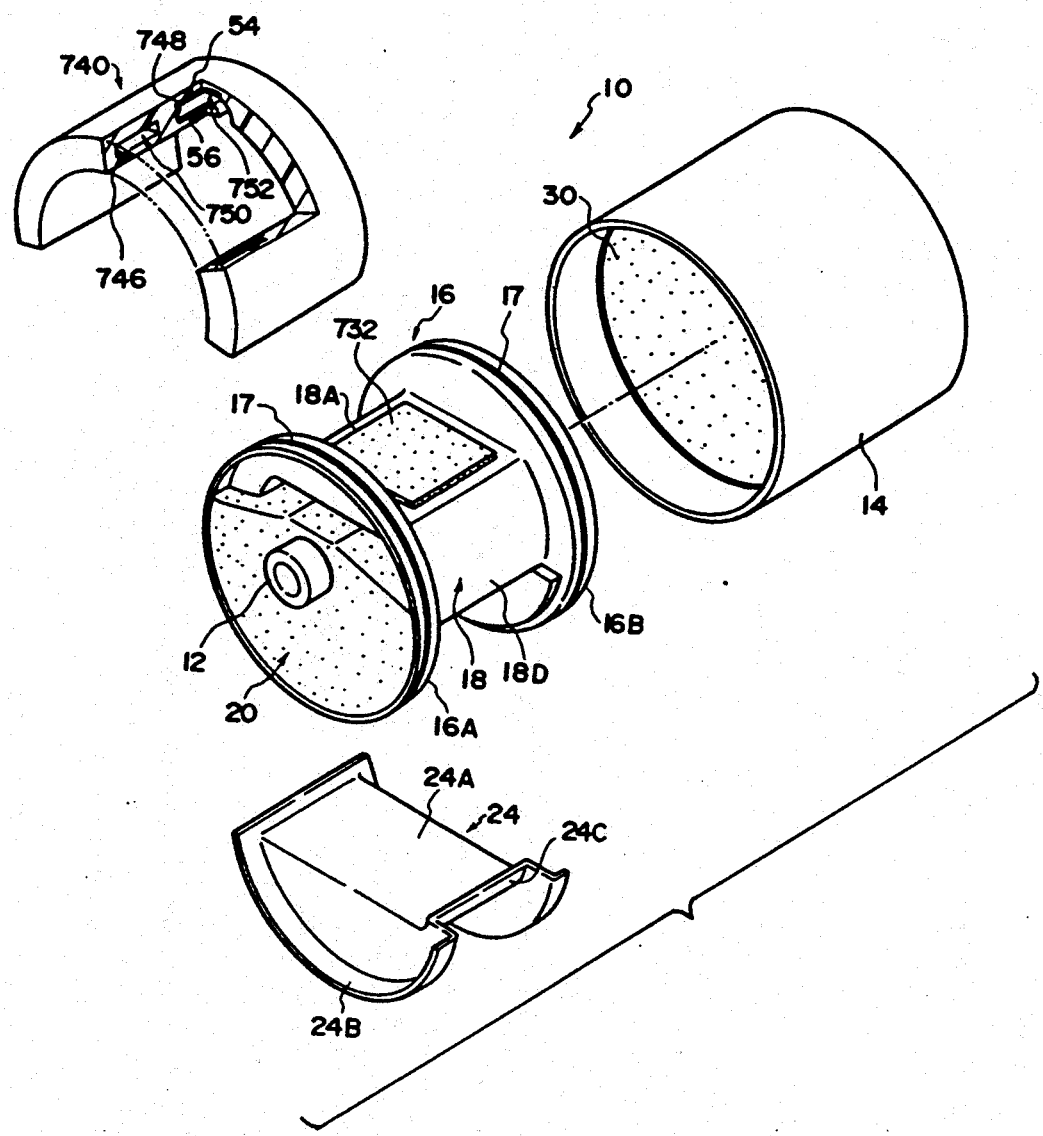
FIG. 14 is an exploded perspective view illustrating the seventh embodiment of the vibration isolation apparatus of the present invention.

FIGS. 12 to 14 show a seventh embodiment of the vibration isolation apparatus 10 of the present invention. The structure and numerals remain identical to those shown in the first embodiment. Therefore the same numerals are used, and description of similar structures is omitted.

As shown in FIG. 12, the intermediate cylinder 16 has an opening portion on the plane portion 18A of the small diameter portion 18 thereof, which is blocked by a rubber membrane 732 having a thick wall. As shown in FIG. 14, an arc-shaped orifice member 740, is placed on the small diameter portion 18 of the intermediate cylinder 16. Accordingly, as shown in FIGS. 12 and 13, the orifice member 740, the plane portion 18A of the small diameter portion 18, and the rubber membrane 732 define a second auxiliary fluid chamber 744.

As shown in FIG. 12, the outer periphery of the orifice member 740 has substantially the same outside diameter as the large diameter portions 16A, 16B of the intermediate cylinder 16. As shown in FIG. 14, paths 746 and 748 are provided in the orifice member 740 longitudinally along the peripheral direction of the orifice member 740.

As shown in FIG. 13, the path 746 passes through the orifice member 740. An opening portion 746A is provided at longitudinal one end of the path 746, and an opening portion 746B is provided at the other longitudinal end of the path 746. The path 746 is connected through the opening portion 746A to the main fluid chamber 26, is connected through the opening portion 746B to the first auxiliary fluid chamber 36, and is thus defined as a shake orifice 750. Furthermore, the path 748 is so designed as to have a length of approximately half of the length of the orifice member 740 in the peripheral direction. An opening portion 748A is provided at one longitudinal end of the path 748, and an opening portion 748B is provided at the other longitudinal end of the path 748. The path 748 is connected through the opening portion 748A to the main fluid chamber 26, is connected through the opening portion 748B to the second auxiliary fluid chamber 744, and is thus defined as an idle orifice 752.

As shown in FIG. 12, the above-mentioned electrode plates 54, 56 are mounted on both side surfaces of the above-mentioned path 748 such that they are opposed to each other. Other structures remain identical to those of the first embodiment.

The operation of the seventh embodiment of the present invention will be described.

When shake vibration is generated, the control unit 100 energizes the electrode plates 54, 56, which are provided in the idle orifice 752, in order to increase the viscosity of the electric viscous fluid 28 in the idle orifice 752. Consequently, the electric viscous fluid 28 does not flow through the idle orifice 752. As a result, the electric viscous fluid 28 flows only through the shake orifice 750 so that resonance of the fluid is caused and a flow of the electric viscous fluid 28 has flow resistance in the shake orifice 750 so as to absorb the shake vibration.

When idle vibration in generated, the electrode plates 54, 56, provided in the idle orifice 752, are not energized. On the other hand, since the idle vibration sets the shake orifice 750 in the loading condition, the electric viscous fluid 28 does not flow through the shake orifice 750. Therefore, high pressure is generated in the main fluid chamber 26 so that the electric viscous fluid 28 flows through the idle orifice 752 to vibrate the rubber membrane 732. As a result, resonance of the fluid is caused in the idle orifice 752 to decrease the dynamic spring constant and absorb the vibration.

Figure 15:
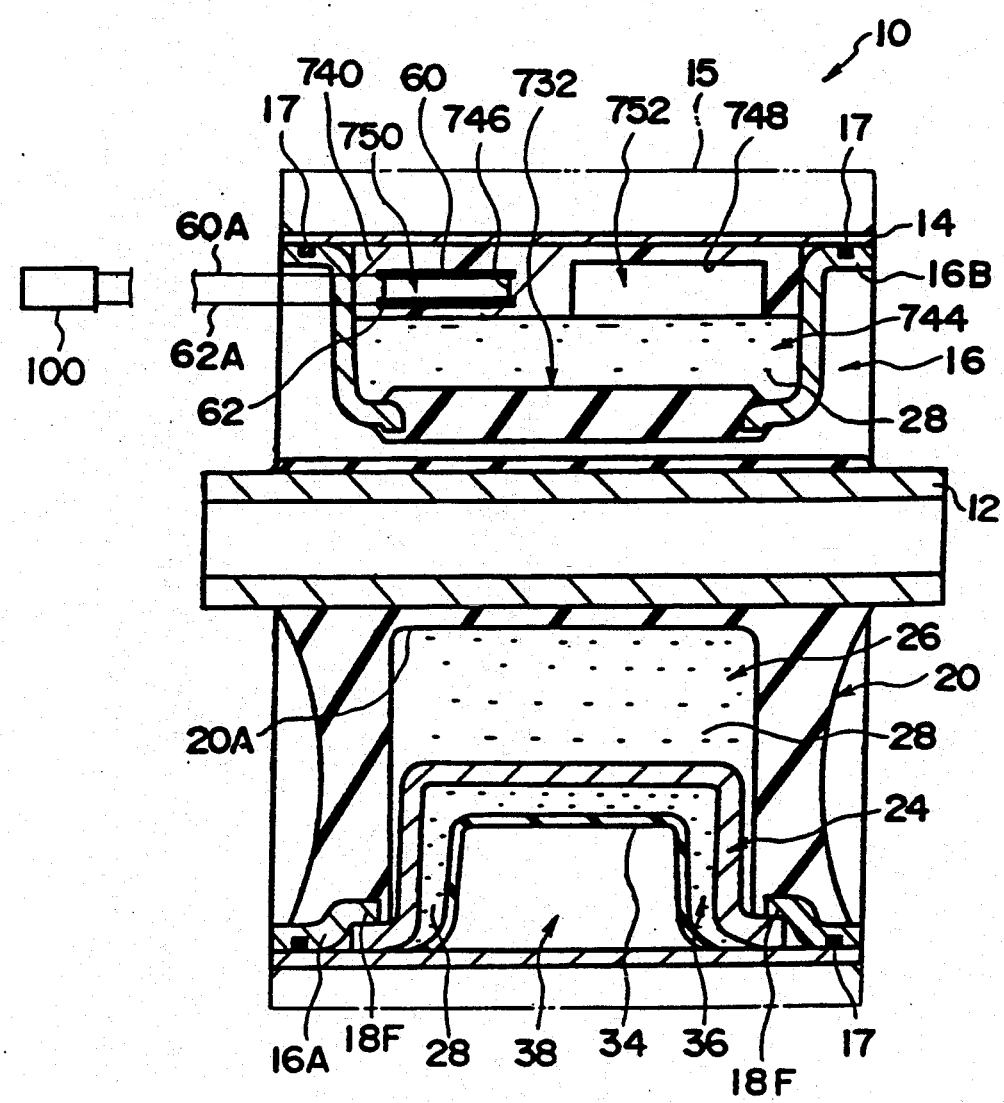
FIG. 15 is a sectional view corresponding to FIG. 1, illustrating an eighth embodiment of a vibration isolation apparatus of the present invention.

FIG. 15 shows an eighth embodiment of the vibration isolation apparatus 10 of the present invention. The structure and numerals remain identical to those shown in the seventh embodiment. Therefore, the same numerals are used, and description of similar structures is omitted.

As shown in FIG. 15, the above-mentioned electrode plates 60, 62 are mounted on both side surfaces of the path 746 in such a manner that they are opposed to each other. Other structures remain identical to those of the seventh embodiment.

The operation of the eighth embodiment of the present invention will be described.

The electrode plates 60, 62, provided in the shake orifice 750, are not energized when shake vibration is generated. The electric viscous fluid 28 thus flows through the shake orifice 750. The flow of the electric viscous fluid 28 through the shake orifice 750 prevents pressure in the main fluid chamber 26 from increasing. Since, the thick-walled rubber membrane 732 can hardly be vibrated, the electric viscous fluid 28 does not flow through the idle orifice 752. As a result, resonance of the electric viscous fluid 28 is caused in the shake orifice 750 and a flow of the electric viscous fluid 28 has flow resistance so that a good damping characteristic can be obtained to absorb the shake vibration.

When idle vibration is generated, the control unit 100 energizes the electrode plates 60, 62 which are provided in the shake orifice 750. The idle vibration sets the shake orifice 750 in the loading condition. In addition, the energized electrode plates 60, 62 cause high viscosity of the electric viscous fluid 28 in the shake orifice 750 thereby further ensuring that the electric viscous fluid 28 does not flow through the shake orifice 750. Consequently, high pressure is generated in the main fluid chamber 26 so that the electric viscous fluid 28 flows through the idle orifice 752 to vibrate the rubber membrane 732. As a result, resonance of the electric viscous fluid 28 is caused in the idle orifice 752 to decrease the dynamic spring constant and absorb the idle vibration.

Figure 16:
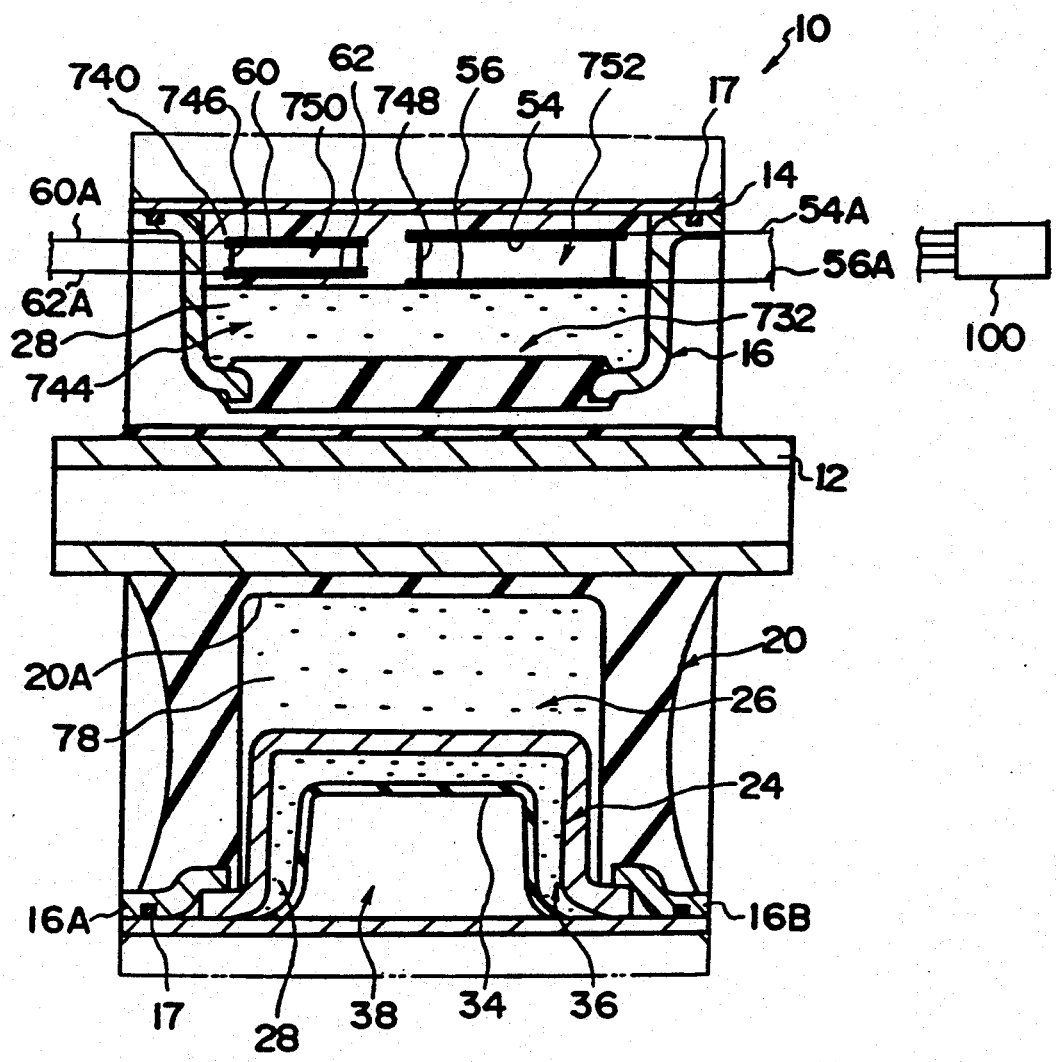
FIG. 16 is a sectional view corresponding to FIG. 1, illustrating a ninth embodiment of a vibration isolation apparatus of the present invention.

FIG. 16 shows a ninth embodiment of the vibration isolation apparatus 10 of the present invention. The structure and numerals remain identical to those shown in the seventh embodiment. Therefore, the same numerals are used, and description of similar structures is omitted.

As shown in FIG. 16, the above-mentioned electrode plates 54, 56 are mounted on both side surfaces of the path 748 in such a manner that they are opposed to each other. In addition, the above-mentioned electrode plates 60, 62 are mounted on both side surfaces of the path 746 in such a manner that they are opposed to each other. Other structures remain identical to those of the seventh embodiment.

The operation of the ninth embodiment of the present invention will be described.

The control unit 100 only energizes the electrode plates 54, 56, which are provided in the idle orifice 752, when shake vibration is generated. Since the electric viscous fluid 28 has high viscosity in the idle orifice 752, the electric viscous fluid 28 does not flow through the idle orifice 752. Accordingly, the electric viscous fluid 28 flows through the shake orifice 750. As a result, resonance of the electric viscous fluid 28 is caused in the shake orifice 750 and a flow of the electric viscous fluid 28 has flow resistance so that a good damping characteristic can be obtained to absorb the shake vibration.

The control unit 100 only energizes the electrode plates 60, 62, which are provided in the shake orifice 750, when idle vibration is generated. The idle vibration sets the shake orifice 750 in the loading condition. In addition, the energized electrode plates 60, 62 cause high viscosity of the electric viscous fluid 28 in the shake orifice 750 thereby further ensuring that the electric viscous fluid 28 does not flow through the shake orifice 750. Consequently, high pressure is generated in the main fluid chamber 26 so that the electric viscous fluid 28 flows through the idle orifice 752 to vibrate the rubber membrane 732. As a result, resonance of the electric viscous fluid 28 is caused in the idle orifice 752 to decrease the dynamic spring constant and absorb the idle vibration.

Each embodiment of the vibration isoration apparatus applied to an engine mount has been discussed above. However, it must be noted that the present invention should not be limited to these specific embodiments and may be applied, for example, to a cab mount or a body mount.

What is claimed is:

1. A vibration isolation apparatus comprising:
   a first cylindrical member connected to one of a vibration producing portion and a vibration receiving portion;
   a second cylindrical member connected to the other of the vibration producing portion and the vibration receiving portion;
   an intermediate cylindrical member arranged between said first and second cylindrical members coaxially with said second cylindrical member, said intermediate cylindrical member having large diameter portions formed at axial ends of said intermediate cylindrical member, and a small diameter portion having a reduced axial diameter;
   a partition plate rigidly fixed between said small diameter portion of said intermediate cylindrical member and said second cylindrical member;
   a main fluid chamber provided between said first and second cylindrical members, the main fluid chamber being expanded and contracted by vibration;
   a first auxiliary fluid chamber communicating through a first restricted path with said main fluid chamber;
   a first expansion and contraction means forming a part of a partition of said first auxiliary fluid chamber;
   a second auxiliary fluid chamber communicating with said main fluid chamber through a second restricted path having a flow resistance less than that of the first restricted path;
   a second expansion and contraction means forming a part of a partition of said second auxiliary fluid chamber and having a greater fluid pressure resistance than said first expansion and contraction means;
   an electric viscous fluid being filled in said main fluid chamber, said first auxiliary fluid chamber, and said second auxiliary fluid chamber and varying in viscosity according to an intensity of electric field applied thereto; and
   electrodes arranged on at least one of said first restricted path and said second restricted path to energize said electric viscous fluid.

2. The vibration isolation apparatus according to claim 1, wherein the sectional area of said second restricted path is larger than that of said first restricted path so that the flow resistance in said second restricted path is smaller than that in said first restricted path.

3. The vibration isolation apparatus according to claim 1, wherein said first and second restricted paths are provided in an orifice member which is arranged between said first cylindrical member and said second cylindrical member.

4. The vibration isolation apparatus according to claim 3, wherein said intermediate cylindrical member, of which said small diameter portion is arranged between said first and second cylindrical members, and said orifice member is arranged outside said small diameter portion.

5. The vibration isolation apparatus according to claim 4, wherein said partition plate is provided outside said small diameter portion of said intermediate cylindrical member such that said main fluid chamber and said first auxiliary fluid chamber are separated by said partition plate.

6. The vibration isolation apparatus according to claim 4, wherein said first expansion and contraction means comprises a first rubber membrane, and said partition plate, having an opening portion and a second rubber membrane which is formed thicker than said first rubber membrane in order to block the opening portion and serves as said second expansion and contraction means, being arranged outside said small diameter portion of said intermediate cylindrical member, such that said first auxiliary fluid chamber and said second auxiliary fluid chamber are separated by said partition plate.

7. The vibration isolation apparatus according to claim 1, wherein said first and second expansion and contraction means are formed of rubber membranes, said second expansion and contraction means being formed thicker than said first expansion and contraction means so that said second expansion and contraction means has a greater fluid pressure resistance than said first expansion and contraction means.

8. The vibration isolation apparatus according to claim 1, wherein said electrodes are arranged in said second restricted path, and further comprising a control unit provided to prevent said electric viscous fluid from flowing through said second restricted path by energizing said electrodes when shake vibration is generated.

9. The vibration isolation apparatus according to claim 1, wherein said electrodes are arranged in said first restricted path, and further comprising a control unit provided to prevent said electric viscous fluid from flowing through said first restricted path by energizing said electrodes when idle vibration is generated.

10. The vibration isolation apparatus according to claim 1, wherein said electrodes are arranged in both of said first and second restricted paths, and further comprising a control unit provided to prevent said electric viscous fluid from flowing through said second restricted path by energizing said electrodes arranged on said second restricted path, when shake vibration is generated and to prevent said electric viscous fluid from flowing through said first restricted path by energizing said electrodes arranged on said first restricted path, when idle vibration is generated.

* * * * *